United States Patent
Sanchez et al.

(10) Patent No.: US 7,533,128 B1
(45) Date of Patent: May 12, 2009

(54) DATA DISTRIBUTION SERVICE AND DATABASE MANAGEMENT SYSTEMS BRIDGE

(75) Inventors: Fernando Crespo Sanchez, Moutnain View, CA (US); Rajive Joshi, San Jose, CA (US); Gerardo Pardo-Castellote, Palo Alto, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 397 days.

(21) Appl. No.: 11/253,504

(22) Filed: Oct. 18, 2005

(51) Int. Cl.
*G06F 7/00* (2006.01)
*G06F 12/00* (2006.01)
*G06F 17/00* (2006.01)
*G06F 17/30* (2006.01)

(52) U.S. Cl. .......................... 707/104.1; 707/4; 707/10; 707/101; 707/102; 707/201

(58) Field of Classification Search .................... 707/10, 707/100–102, 201, 4, 104.1
See application file for complete search history.

(56) References Cited

U.S. PATENT DOCUMENTS

| | | | |
|---|---|---|---|
| 4,484,294 A | 11/1984 | Noss | 364/513 |
| 4,568,866 A | 2/1986 | Floro et al. | 318/696 |
| 4,796,179 A | 1/1989 | Lehman et al. | 364/300 |
| 5,055,755 A | 10/1991 | Ozawa et al. | 318/568.11 |
| 5,086,385 A | 2/1992 | Launey et al. | 364/188 |
| 5,404,288 A | 4/1995 | McDunn | 364/140 |
| 5,546,301 A | 8/1996 | Agrawal et al. | 364/140 |
| 5,727,203 A * | 3/1998 | Hapner et al. | 707/103 R |
| 5,838,563 A | 11/1998 | Dove et al. | 364/188 |
| 5,940,827 A | 8/1999 | Hapner et al. | 707/8 |
| 5,971,581 A | 10/1999 | Gretta et al. | 364/188 |
| 5,974,417 A * | 10/1999 | Bracho et al. | 707/10 |
| 6,009,428 A * | 12/1999 | Kleewein et al. | 707/10 |
| 6,026,352 A | 2/2000 | Burns et al. | 702/182 |
| 6,058,445 A | 5/2000 | Chari et al. | 710/302 |
| 6,076,952 A | 6/2000 | Gretta et al. | 364/188 |
| 6,106,569 A | 8/2000 | Bohrer et al. | 717/1 |

(Continued)

OTHER PUBLICATIONS

"*Object-Oriented Information Systems Planning and Implementation*", David A. Taylor, pp. 1-172, 215-282, Apr. 10, 1992.

(Continued)

*Primary Examiner*—James Trujillo
*Assistant Examiner*—Jorge A Casanova
(74) *Attorney, Agent, or Firm*—Beyer Law Group LLP

(57) ABSTRACT

A bridge to integrate representation of global data space in Data Distribution Service (DDS) and Data Management Systems (DBMS). The DDS concept of a keyed topic and a type is mapped to the DBMS notion of a keyed table and schema representing data-object instances. Rules are specified for translating between a DBMS table record and the DDS wire format representation. Four bridge components are possible: Bridge-DDS-DBMS-Publication to store outgoing published data; Bridge-DDSDBMS-Subscription to store incoming subscribed data; Bridge-DBMS-DDS-Publication to publish changes to a DBMS table; and Bridge-DBMS-DDS-Subscription to update a DBMS Table based on received data subscriptions from the network. Mechanisms are provided for preventing publication of data seen by DDS, and for preventing application of changes already made in a DBMS table. Use cases include: data caching in a database; automatic persistency of all (or selected) global data-objects; distributing database contents; and multi-vendor database content transfer.

68 Claims, 21 Drawing Sheets

U.S. PATENT DOCUMENTS

| | | | | |
|---|---|---|---|---|
| 6,119,125 | A | 9/2000 | Gloudeman et al. | 707/103 |
| 6,134,706 | A | 10/2000 | Carey et al. | 717/1 |
| 6,154,680 | A | 11/2000 | White et al. | 700/19 |
| 6,195,591 | B1 | 2/2001 | Nixon et al. | 700/83 |
| 6,226,788 | B1 | 5/2001 | Schoening et al. | 717/107 |
| 6,226,792 | B1 | 5/2001 | Goiffon et al. | 717/11 |
| 6,259,958 | B1 | 7/2001 | Steinman et al. | 700/97 |
| 6,269,396 | B1 | 7/2001 | Shah et al. | 709/223 |
| 6,425,119 | B1 | 7/2002 | Jones et al. | 717/100 |
| 6,477,439 | B1 | 11/2002 | Bernaden, III et al. | 700/103 |
| 6,643,682 | B1 * | 11/2003 | Todd et al. | 709/202 |
| 6,725,446 | B1 | 4/2004 | Hahn et al. | 717/103 |
| 6,751,663 | B1 | 6/2004 | Farrell et al. | 709/224 |
| 6,917,935 | B2 * | 7/2005 | Zwiegincew et al. | 707/4 |
| 2002/0178273 | A1 * | 11/2002 | Pardo-Castellote et al. | 709/230 |
| 2003/0014391 | A1 * | 1/2003 | Evans et al. | 707/1 |
| 2004/0064553 | A1 | 4/2004 | Kjellberg | 709/224 |
| 2004/0083274 | A1 * | 4/2004 | Katiyar et al. | 709/217 |
| 2004/0215621 | A1 * | 10/2004 | Harvey et al. | 707/10 |
| 2005/0267896 | A1 * | 12/2005 | Goodman et al. | 707/10 |
| 2006/0031225 | A1 * | 2/2006 | Palmeri et al. | 707/10 |
| 2006/0106859 | A1 * | 5/2006 | Eugene et al. | 707/102 |

OTHER PUBLICATIONS

"*Rational Rose, Using Rational Rose 4.0*", Rational Software Corporation, pp. 1-219, Nov. 1996.

"*Visual Modeling with Rational Rose and UML*", Terry Quatrani, pp. 1-6, Third Printing Apr. 1998.

Case et al., "*A Simple Network Management Protocol (SNMP)*", May 1990, IETF, RFC 1157, pp. 2,6-8,10,12,16,19-20, 25, 27.

McCloghrie et al., "*Management Information Base for Network Management of TCP/IP Based Internets*", Aug. 1988, IETF, RFC 1066, pp. 10-11.

"*Unified Modeling Language UML Booch & OMT*", Quick Reference for Rational Rose 4.0, Nov. 1996.

"*Visual Object-Oriented Programming Concepts and Environments*", M.M. Burnett et al., published 1994, pp. 1-274.

"*Dictionary of Object Oriented Technology*", Firesmith, published 1995, p. 85.

Rose et al., "*Structure and Identification of Management Information for TCP/IP Based Internets*", Aug. 1988, IETF, RFC 1065, pp. 7-8 and 10.

Information Systems Institute, USC, "*Internet Protocol*", Sep. 1981, IETF, RFC 791, p. 11.

J. Postel, "*User Diagram Protocol*", Aug. 28, 1980, IETF, RFC 768, p. 1.

* cited by examiner

FIGURE 3

Mapping between DDS and DBMS semantic models

| Data Distribution Service (DDS) | Database Management System (DBMS) |
|---|---|
| Accessed via DDS APIs<br>Various language bindings (eg. C, C++, Java etc.) | Accessed via SQL<br>Various language bindings (e.g. C/C++: ODBC, Java: JDBC, etc.) |
| Domain<br>Identified by domain_id | Database<br>Identified by the data source name (DSN). |
| Type Metadata<br>Identified by "type_name". The structure is specified in Interface Description Language (IDL). | Table Schema<br>Identified by table description. |
| Topic<br>Identified by "topic_name"<br><br>A DataWriter can modify a topic's data-objects. A DataReader can access the topic's data-objects. | Table<br>The Database is identified by data source name (DSN). A topic is identified by "/dsn/topic_name" ("Table Name"). In general, the name of the table doesn't have to match the topic name; it can be a configurable parameter. |
| Instance<br>[Data-object] | A single Row in a Table if no history is stored; or Multiple Rows in a Table if history is stored. The history can be specified as a configurable parameter. |
| Instance Key Fields<br>[Data-object keys] | Primary Key in Table |
| DataWriter::write*() [all variations]<br>OR<br>DataReader::take*() or read*() [all variations] | (Keep last, i.e. No History) If a row is not already there, INSERT a row for the instance; otherwise UPDATE the row.<br>(Keep N, i.e. History) If the history buffer is not full INSERT a row for the new value of the instance. Otherwise REPLACE the oldest one. |
| DataWriter::dispose*() [all variations] OR<br>DataReader::take*() or read*() [all variations] of a data-object in instance state of NOT_ALIVE_DISPOSED_INSTANCE_STATE | DELETE row in the table |
| Publisher::begin_coherent_changes()<br>Publisher::end_coherent_changes() | Begin Transaction<br>End Transaction |
| PresentationQosPolicy Group Access, Ordered<br>Publisher containing Table DataWriters<br>Subscriber containing Table DataReaders | Referential Integrity.<br>Group of Tables for which order and coherency must be preserved. |

FIGURE 4

Mapping between DDS and DBMS data representation

| Data Distribution Service (DDS) Data Representation | Database Management System (DBMS) Data Representation |
|---|---|
| Data described via Interface Description Language (IDL) Mapped to various language specific representations (e.g. C, C++, Java etc.) via a code generator. | Data described via SQL Table Schema |
| Enum Types | SQL Integer |
| Primitive Types | Corresponding primitive types in SQL. |
| Struct fields | Non-NULL table columns with names and types matching the struct fields. |
| Nested Struct | Non-NULL table columns with names and types matching recursively flattened out fields of the nested struct. Note: alternate mappings are also possible |
| Union | Similar to the struct above, treating the discriminator as another field, with the difference that the discriminator column must be non NULL, whereas the other fields columns can be NULL. The cases are embedded in the field column names. |
| Typedef | The mapping for the underlying type obtained by fully resolving the typedef. |
| Array | Similar to the struct above, with the array elements flattened out, one item per index in the array. |
| Sequence (bounded) | Same as for an Array |
| Sequence (unbounded) | A Table of sequence elements, with additional columns: one for the index of the sequence element and the others that refer to the container element in another Table using either 1) a "foreign" keys that are the primary keys of the container table; 2) a "foreign" keys that are the primary keys of the container table, plus a column to identify the sequence field in the container; or 3) a digital signature of the container row contents. |

FIGURE 5

Mapping between DDS and DBMS data representation

IDL and SQL Identifier Differences

```
        IDL identifiers may start with a "_" and cannot have a "."

<IDL identifier> ::= (<letter>|'_') (<letter>|'_'|<digit>)*

SQL identifiers cannot start with an "_", but may be quoted.
        SQL quoted string identifiers may contain any characters.

<SQL identifier> ::= ( <identifier> | <quoted string> | <keyword> )

<identifier> ::= <letter>(<letter>|'_'|'$'|'#'|<digit>)*
```

500  IDL to SQL Identifier Mapping

```
               An IDL identifier maps to a "quoted string" in SQL.

IDL identifiers corresponding to nested fields, arrays, and sequences
      are mapped to specially formatted quoted string identifiers in SQL,
                          using "." as the separator.

NOTE: The choice of a "." and quotes are for illustration only. Other embodiments are possible.
```

FIGURE 6

Mapping between DDS and DBMS data representation

Primitive Type Mapping

600

| IDL Type | IDL Field Name | SQL Type | Table Field Name |
|---|---|---|---|
| CHAR | my_field | CHAR(1) | "my_field" |
| WCHAR | my_field | WCHAR | "my_field" |
| OCTET | my_field | BINARY(1) | "my_field" |
| BOOLEAN | my_field | TINYINT | "my_field" |
| SHORT | my_field | SMALLINT | "my_field" |
| UNSIGNED SHORT | my_field | SMALLINT | "my_field" |
| LONG | my_field | INTEGER | "my_field" |
| UNSIGNED LONG | my_field | INTEGER | "my_field" |
| DOUBLE | my_field | DOUBLE | "my_field" |
| FLOAT | my_field | REAL | "my_field" |
| STRING<LENGTH> | my_field | VARCHAR(LENGTH) | "my_field" |
| WSTRING<LENGTH> | my_field | WVARCHAR(LENGTH) | "my_field" |
| LONG LONG | my_field | BIGINT | "my_field" |
| UNSIGNED LONG LONG | my_field | BIGINT | "my_field" |
| LONG DOUBLE | my_field | BINARY(128) | "my_field" |

*NOTE: The choice of specific naming conventions is for illustration only.
Other embodiments are possible.*

Mapping between DDS and DBMS data representation

Array Mapping Example

| IDL Type | SQL Table Schema |
|---|---|
| struct MyArrayContainer {<br>   long my_key_field; //@key<br><br>   long my_array_field[2];<br>}; | Create Table "MyArrayContainer" (<br>   "my_key_field" INTEGER NOT NULL,<br><br>   "my_array_field[0]" INTEGER NOT NULL,<br>   "my_array_field[1]" INTEGER NOT NULL,<br><br>   PRIMARY KEY("my_key_field")<br>); |

Bounded Sequence Mapping Example

| IDL Type | SQL Table Schema |
|---|---|
| struct MySequenceContainer {<br>   long my_key_field; //@key<br><br>   sequence<long,2> my_seq_field;<br>}; | Create Table "MySequenceContainer" (<br>   "my_key_field" INTEGER NOT NULL,<br><br>   "my_seq_field#length" INTEGER NOT NULL,<br>   "my_seq_field[0]" INTEGER,<br>   "my_seq_field[1]" INTEGER,<br><br>   PRIMARY KEY("my_key_field")<br>); |

*NOTE: One could use the mapping for unbounded sequences for bounded sequences also.*

FIGURE 9a

Mapping between DDS and DBMS data representation
Unbounded Sequence Mapping Examples

```
struct MySequenceContainer {
    long my_key_field; //@key sequence<long> my_seq_field;
};
```

Option 1 →

One table per sequence field, per container

```
Create Table "MySequenceContainer" (
    "my_key_field" INTEGER NOT NULL,

-- Holds the name of the sequence table
    -- E.g: "MySequenceContainer.my_seq_field"
    "sequence.my_seq_field" VARCHAR(256) NOT NULL, PRIMARY KEY("my_key_field")
);
Create Table "MySequenceContainer.my_seq_field" (
    "my_key_field" INTEGER NOT NULL,
    FOREIGN KEY("my_key_field") REFERENCES
            "MySequenceContainer"("my_key_field"), "index" INTEGER NOT NULL,
    "element" INTEGER NOT NULL, PRIMARY KEY("my_key_field", index)
);
```

Option 2

One table per sequence type, per container

```
Create Table "MySequenceContainer" (
    "my_key_field" INTEGER NOT NULL,

-- Holds the name of the sequence table --
    -- E.g: "MySequenceContainer.Sequences.long"
    "sequence.my_seq_field" VARCHAR(256) NOT NULL, PRIMARY KEY("my_key_field")
);
Create Table "MySequenceContainer.Sequences.long" (
    "my_key_field" INTEGER NOT NULL,
    FOREIGN KEY("my_key_field") REFERENCES
            "MySequenceContainer"("my_key_field"), -- Holds the name of the container's sequence field
    -- E.g. "sequence.my_seq_field"
    "sequence.field" VARCHAR(256) NOT NULL, "index" INTEGER NOT NULL,
    "element" INTEGER NOT NULL, PRIMARY KEY("my_key_field", "sequence.field", index)
);
```

Publications/Subscriptions Table Example

1600

```
Create Table DDS_Publications (
   table_name VARCHAR(100) NOT NULL, domain_id INTEGER NOT NULL,
   topic_name VARCHAR(100),
   type_name VARCHAR(100), -- DDS QoS for BridgeDataWriter
   --

PRIMARY KEY(table_name)
```

1605

```
Create Table DDS_Subscriptions (
   table_name VARCHAR(100) NOT NULL, domain_id INTEGER NOT NULL,
   topic_name VARCHAR(100),
   type_name VARCHAR(100), -- DDS QoS for BridgeDataReader
   --

PRIMARY KEY(table_name)
```

FIGURE 18

Global Data-Object Persistency

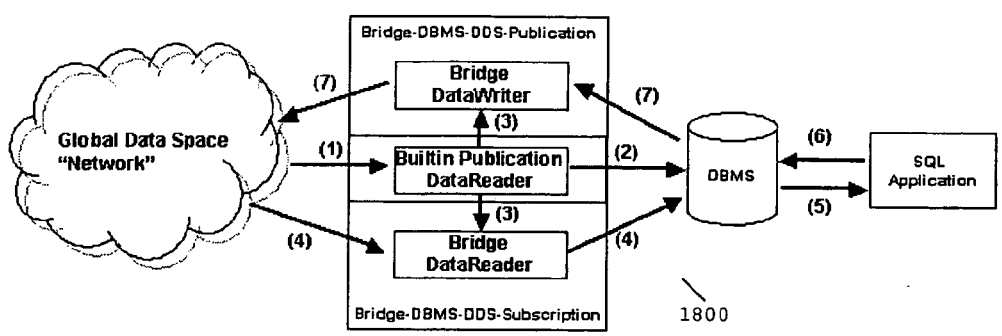

(1) Discovered DDS a Topic (may be used to disseminate multiple global-data objects)

(2) Create a DBMS Table for the discovered Topic using its reflective type code information to define the Table schema (3) Configure Bridge-DBMS-DDS-Subscription and optionally Bridge-DBMS-DDS-Publication to use the newly created Table associated with the newly discovered Topic.

(4) Store received data into the DBMS Table using Bridge-DBMS-DDS-Subscription (5) Retrieve data from the database (6) Update the database (7) Optionally Publish the changes via Bridge-DBMS-DDS-Publication

Multi-vendor Database content Transfer

DATA DISTRIBUTION SERVICE AND DATABASE MANAGEMENT SYSTEMS BRIDGE

FIELD OF THE INVENTION

The present invention relates to Data Distribution Service and Relational Database Management System Integration and, more particularly, to schemes that enable data distributed by the OMG Data Distribution Service (DDS) to be automatically stored in a relational database management system and accessed via SQL or ODBC interfaces, and conversely enable the contents of a relational database management system to be automatically distributed via DDS.

BACKGROUND OF THE INVENTION

Relational Database Management Systems (DBMS) are an established standard technology for storage and management of large volumes of structured data. A DBMS organizes a global data space around a table data model.

The Data Distribution Service (DDS) is a new Object Management Group (OMG) Standard for high performance data centric publish subscribe communication. DDS is organized around the distributing data in a global data space across nodes on a network.

SUMMARY OF THE INVENTION

In accordance with an aspect of the present invention, there is provided a bridge to map between the representation of a global data space in Data Distribution Service (DDS) and in a Data Management System (DBMS). The DDS concept of a keyed topic and a type is mapped to the DBMS notion of a keyed table and schema representing data-object instances. A mapping between the DDS data type representation and DBMS schema representation is defined. This mapping is also utilized to translate a DBMS table record to the DDS wire format representation and vice-versa. Four bridge components are defined: Bridge-DDS-DBMS-Publication to store outgoing published data; Bridge-DDS-DBMS-Subscription to store incoming subscribed data; Bridge-DBMS-DDS-Publication to publish changes to a DBMS table; and Bridge-DBMS-DDS-Subscription to update a DBMS Table based on received data subscriptions from the network. Mechanisms to prevent publication of data already seen by DDS, and to prevent application of changes already made in a DBMS table are described. The bridge components can be used in combinations to achieve different use cases: to achieve automatic data caching in a database; to automatically persist global data-objects in a database; to automatically distribute database contents; and to transfer database contents between disparate multi-vendor DBMS.

BRIEF DESCRIPTION OF THE DRAWINGS

A complete understanding of the present invention may be obtained by reference to the accompanying drawings, when considered in conjunction with the subsequent, detailed description, in which:

FIG. 3 is a Mapping between DDS and DBMS semantic models;

FIG. 4 is a Mapping between DDS and DBMS data representation;

FIG. 5 is a Mapping of IDL identifier to SQL identifiers;

FIG. 6 is a Mapping of IDL primitive types to SQL primitive types;

FIG. 8 is a Mapping of IDL arrays and bounded sequences to SQL tables;

FIG. 9a is a Mapping of IDL unbounded sequences to SQL tables: Options 1 and 2;

FIG. 16 is a Description of the Bridge-DBMS-DDS-Publication component and Bridge-DBMS-DDS-Subscription component Configuration Table Schemas;

FIG. 18 is an Example of global data-object persistency;

For purposes of clarity and brevity, like elements and components will bear the same designations and numbering throughout the FIGURES.

DESCRIPTION OF THE PREFERRED EMBODIMENT

Figure 1:
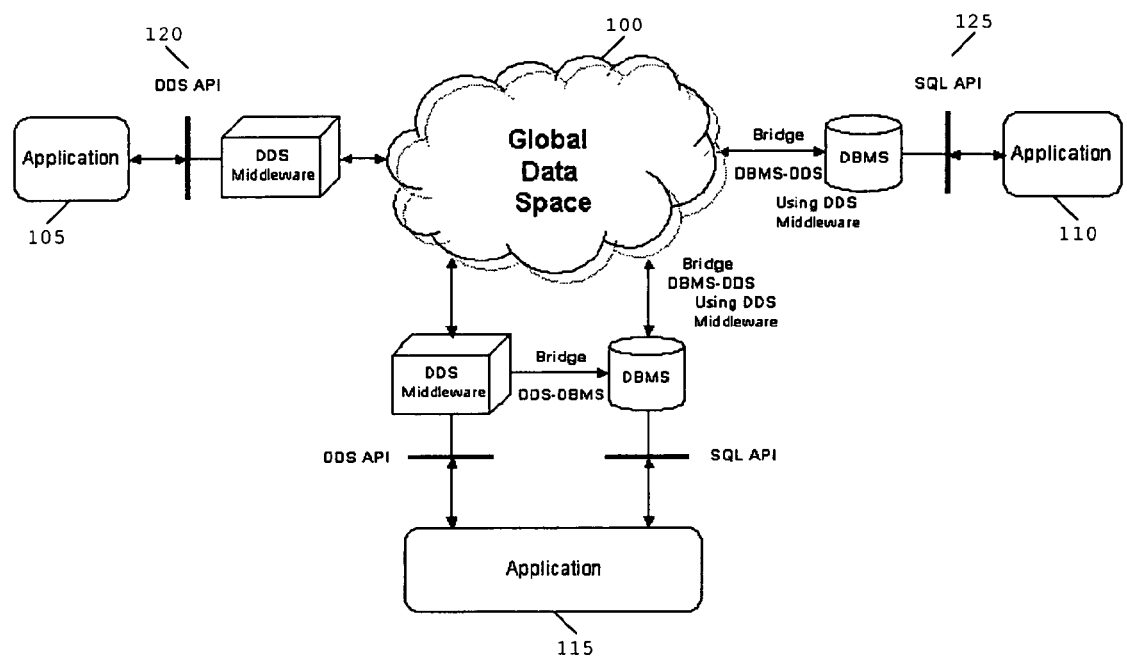
FIG. 1 is a Conceptual diagram of the Unified Global Data Space defined by the collection of data common between the participating nodes.

Since DDS and DBMS technologies are data centric and complementary, they can be combined to enable a new class of applications. In particular, DDS can be used to produce a truly decentralized distributed DBMS, while DBMS technology can be used to provide persistence for DDS data. It is also desirable to enable distributed applications having some nodes operating on the DDS data representation, with other nodes operating on the DBMS data representation of the same global data.

There are no known solutions that unify DBMS and DDS technology. Among related technologies, distributed databases are known. Generally these are based around the idea of replicating or distributing a master database stored on a central server, or portions of a master database on other nodes. Such solutions have a hub and spoke architecture, and disseminate a centralized database. Decentralized solutions for replicating databases do exist; some even using a publish-subscribe architecture underneath. However, these are not based on DDS.

There are no current solutions that attempt to integrate DBMS and DDS as complementary technologies, and allow user applications to access the global data space either via the DDS APIs or via the DBMS SQL. The current distributed database solutions only allows user applications to access the data via SQL; whereas DDS implementations allow user applications to access the data via the DDS APIs only.

An integrated approach allows the user applications to choose the best mechanism to access the global data space; updates made via the DBMS SQL will be transparently visible to DDS user applications; updates made via DDS APIs will be transparently visible to DBMS user applications.

Some "objects" are listed below. The "invention" is defined by the claims and is not limited to achieving one or more of the "objects" listed below.

It is therefore an object of the invention to provide a mapping between the DDS and DBMS semantic models.

It is another object of the invention to provide a mapping between the DDS and DBMS data representations.

It is another object of the invention to provide a mechanism for converting between DDS data samples and DBMS table updates.

It is another object of the invention to provide a mechanism for directly converting DBMS table data to the DDS wire format and vice-versa.

It is another object of the invention to provide a component for saving each data sample written by a DDS DataWriter into a DBMS table.

It is another object of the invention to provide a component for saving each data sample received to by a DDS DataReader in a DBMS table.

It is another object of the invention to provide a mechanism for configuring a DDS DataWriter or DataReader to automatically store the samples in a DBMS table.

It is another object of the invention to provide a component for publishing the changes made to a DBMS table via SQL user operations as DDS data samples that can be received by DDS user applications.

It is another object of the invention to provide a component for subscribing to data samples from the network using DDS, and updating a DBMS table based on the received changes.

It is another object of the invention to provide a mechanism for configuring the DBMS tables to be automatically published or subscribed to using DDS.

It is another object of the invention to provide a mechanism for filtering out the changes received via DDS that have already been applied to a DBMS table.

It is another object of the invention to provide a mechanism for filtering out the changes to a DBMS table that have already been communicated via DDS.

It is further an object of the invention to describe how the bridge components can be used together to achieve automatic data caching in a database; to automatically persist all (or selected) global data-objects in a database; to automatically distribute database contents; and to transfer database contents between disparate multivendor DBMS.

The detailed description of the invention is organized into three parts.

Part I: Unified global data space 100 (FIGS. 1 to 10), deals with the idea of unifying the data spaces of the Object Management Group's (OMG) Data Distribution Service (DDS) and relational database management system (DBMS). In this part we describe the notion of a unified global data space 100, and define the mapping between the DDS and DBMS representations of data.

Part II: Bridge 1100 components (FIGS. 11 to 16), deals with describing the components used to realize the unified global data space 100. In this part we describe how the mapping can be used to realized four different bridge 1100 components that can be used standalone or together. We describe the configurations, the mechanisms and the behavior of the bridge 1100 components in detail.

Part III: Use cases (FIGS. 17 to 20), deals with describing a subset of interesting use cases that can be realized using the bridge 1100 components. Many other useful applications are possible using different combinations and configurations of these components.

We now describe each of these parts in detail. While the description refers to OMG's, DDS, the broader concept set forth herein is not limited to the particular implementation of a data distribution service.

Part I: Unified global data space 100 (FIGS. 1 to 10).

A "distributed application" includes of a set of user applications spread across nodes of a network, operating on a common set of data. Changes to the common data can be communicated from one user application 115 (for example, a DDS user application 105) to others using the Object Management Group's (OMG) Data Distribution Service (DDS). Furthermore, a user application 115 may store the data in a database management system (DBMS). A SQL user application 110 may use a separate "local DBMS" or share a DBMS with one or more other user applications.

The global data space 100 represents the space of user data-objects, common among distributed nodes. A data-object may be in local "storage" at one of the nodes or in "transmission" between nodes. A data-object can be accessed and updated using the DDS APIs or DBMS (SQL) APIs.

FIG. 1 is a Conceptual diagram of the Unified Global Data Space 100 defined by the collection of data common between the participating nodes.

The bridge 1100 components described in this invention enable a user application 115 to automatically store the global data-objects accessed or updated via DDS APIs into a DBMS. Furthermore, bridge 1100 components also enable a DBMS to directly access and update objects in the global data space 100 (using DDS as the communication middleware). The resulting unified global data space 100 represents the collective user data-objects shared among the nodes, that may be stored locally on a node and distributed among the nodes.

Figure 2:
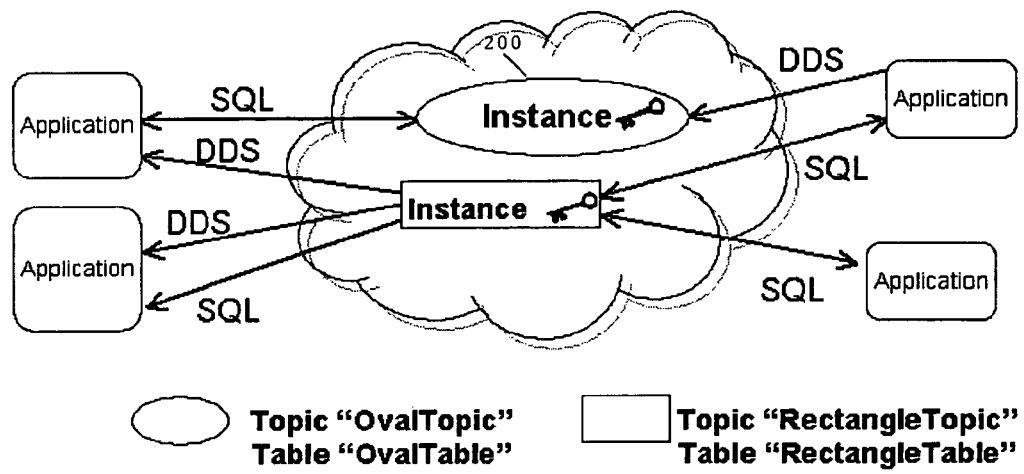
FIG. 2 is a Diagram showing that a global data-object identified by a unique key in the unified global data space can be accessed via either via DDS APIs or via SQL APIs.

FIG. 2 is a diagram showing that a global data-object identified by a unique key in the unified global data space 100, can be accessed via either DDS APIs or via SQL APIs.

A user application 115 can access data-objects in the unified global data space 100 using either via DDS APIs or SQL APIs or both. The common data can manifest in various forms, typically depending on the implementation technology.

When accessed using DDS APIs, a data-object is represented using language specific constructs for representing data structures. In DDS terminology, common data is organized into strongly typed "Topics". A topic can be used to communicate changes to one or more user-defined data-object instances. A data-object instance 200 is identified by the key fields in the type data structure.

When accessed using SQL APIs, a data-object is represented as a row in a Table. In DBMS terminology, data is stored into strongly typed Tables, where each row may represent a user data-object instance 200.

We now describe how various concepts of DDS and DBMS correspond to each other. For example, FIG. 3 illustrates a Mapping between DDS and DBMS semantic models.

In the DDS-DBMS model map 300, a DDS domain corresponds to a Database in the DBMS. Several DomainParticipants may correspond to the same Database in a DBMS; thus it is a many-to one mapping.

The DDS type meta-data specified in an Interface Description Language (IDL) file corresponds to a Table schema in a DBMS. A DDS topic corresponds to a Table in the DBMS, which may be named after the DDS topic name.

A data-object instance 200 communicated using a DDS Topic corresponds to a row in the corresponding DBMS Database Table. The DDS data-object instance 200 key fields correspond to the primary keys in the table. The DDS DataWriter::write*( ) operations (i.e. the set of operations on a DDS DataWriter that begin with 'write') operations correspond to inserting a row in a table for a new data-object instance 200; or updating an existing row if the data-object instance 200 was already present in the Table. The DDS DataWriter::dispose*( ) operations (i.e. the set of operations on a DDS DataWriter that begin with 'dispose') correspond to the deletion of the data-object instance's row in the table.

The DDS DataReader::read*( ) or take*( ) operations (i.e. the set of operations on a DDS DataReader that begin with 'read' or a 'take') for data-object instances with an instance-state of NOT_ALIVE_DISPOSED_INSTANCE_STATE correspond to the deletion of the instance's row in the table; for other instance states they correspond to inserting a row in a table for a new instance; or updating an existing row if the data-object instance 200 was already present in the Table.

The DDS PRESENTATION QosPolicy with access scope GROUP and ORDERED access corresponds to preserving the referential integrity of the changes in DBMS tables. For example, when a DBMS table row changes, the dependent table rows that refer to it must also change; the changes are propagated "in order" over the network using DDS, so that at the receiving side, the changes can correctly be applied (possibly a replica of the originating DBMS).

Whereas FIG. 3 illustrates a mapping between semantic models, FIG. 4 illustrates a mapping between DDS and DBMS data representation.

The data types are described using the OMG IDL for the DDS technology, and as SQL table schemas in the DBMS technology.

Continuing with describing how various aspects of DDS and DBMS correspond to each other, FIG. 5 illustrates a mapping of IDL identifiers (DDS) to SQL identifiers (DBMS).

An IDL identifier may contain an underscore as a leading character "_"; this is not allowed in SQL. However, SQL allows quoted identifiers with arbitrary contents. So, in the IDL to SQL identifier mapping 500, IDL identifiers are mapped to corresponding quoted string identifiers in SQL. For complex IDL types (structs, arrays), the corresponding SQL identifier is composed of parts that are separated by characters now allowed in IDL identifiers (for example: ".", "#", or "[").

Note that using a quoted string is a means of escaping the IDL identifiers. Alternatively, another escaping or name mangling scheme can be used.

FIG. 6 illustrates a mapping of IDL primitive types (DDS) to SQL primitive types (DBMS).

In the IDL primitive types to SQL map 600, each IDL primitive type is mapped to a SQL primitive type.

Figure 7:
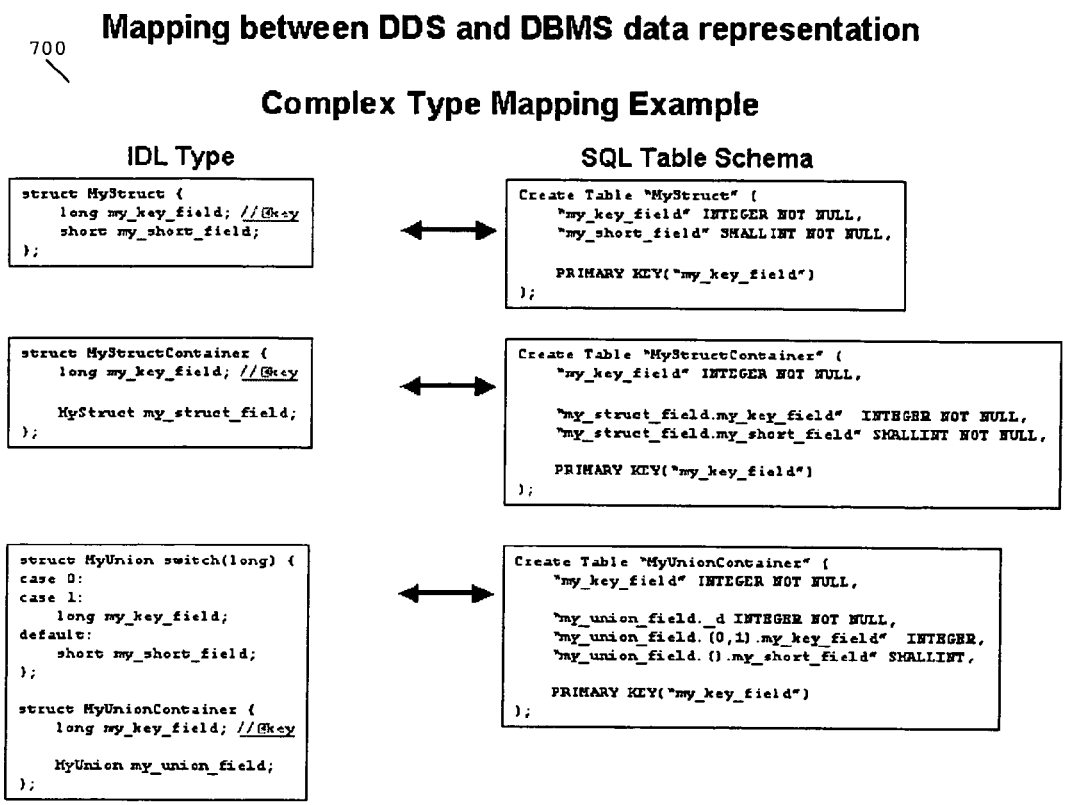
FIG. 7 is a Mapping of IDL structures to SQL tables.

FIG. 7 illustrates a mapping of IDL structures and unions (DDS) to SQL tables (DBMS).

In the IDL struct to SQL table map 700, the fields in IDL 'struct' correspond to columns of the same name and corresponding primitive types in an SQL table. Nested 'struct's fields names are flattened out using the separator to get the corresponding column names. In this application, we will use the dot (".") as the separator; other separators or ways to encode the nested names are possible.

The key fields of the IDL struct become primary keys in the SQL table. If the IDL struct does not specify a key field, a dummy key field of type INTEGER with a fixed value is implied for the SQL table (i.e., an unkeyed IDL struct maps to a single row in the SQL table).

If a DBMS implementation imposes a limit on SQL identifier length, a name mangling scheme may be applied so that identifiers fit within the limits.

Unions in IDL are treated in a manner similar to a struct, where the discriminator is regarded as another field in a struct; with the difference that the discriminator is the only NOT NULL column, the field table columns can be NULL. Also, note that unions behave like unkeyed structs. FIG. 7 illustrates the union mapping: a new column is added to the database table called "_d" to represent the discriminator, and the column names corresponding to IDL union fields are prefixed with case statements under which those fields occur. As illustrated in FIG. 7, "case 0: case 1:" in IDL maps to "(0,1)" column name prefix, and "default:" in IDL maps to "( )" column name prefix. Note that the specific syntax chosen here is for illustration only, and an implementation may choose a alternative syntax.

An data-object instance 200 (or row) in an SQL table is referred by its primary key. Another date-object instance (in another Table) can refer to the row by using its primary key as 'foreign key'.

FIG. 8 is a mapping of IDL arrays and bounded sequences to SQL tables.

In the IDL array and bounded sequence to SQL table map 800, the mapping is similar to that of complex types: the array (or sequence) field name begins the name of the IDL field, followed by the index. For complex array/sequence element types, this is followed by the flattened out field names of the complex element type. For sequences, a length column is also specified in the SQL table.

Note that the SQL table corresponding to the IDL type has columns for each element of the array or bounded sequence, and can result in large tables. Alternatively, the (more complex) IDL unbounded sequence to SQL table map (FIG. 9, see below) can also be utilized for bounded arrays and bounded sequences.

FIG. 9 illustrates alternatives for mapping IDL unbounded sequences to SQL tables.

The unbounded sequence in IDL is a variable length type, and requires special consideration is made when mapping to SQL tables. In the IDL unbounded sequence to SQL table map, an unbounded sequence straddles two SQL tables: the table corresponding to the struct that contains the sequence, and a 'sequence table' containing the sequence elements. There are three implementation options for organizing these tables, offering different trade-offs in the number of tables used and in the computation to access the elements.

Figure 9B:
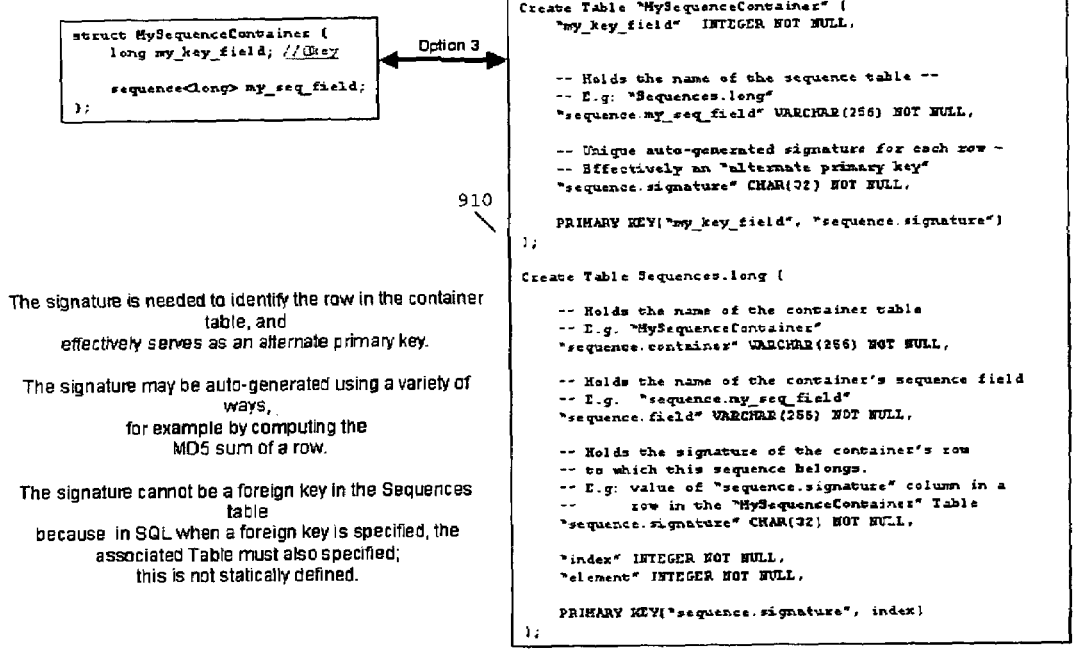
FIG. 9b is a Mapping of IDL unbounded sequences to SQL tables: Option 3.

The general structure of a 'sequence table' includes the columns for the sequence type, and extra columns for the primary key: one for the index of the sequence element, and others for identifying the corresponding container element (i.e. the row in the container table) to which the sequence belongs. Each row of sequence table represents an element in the sequence. This general structure can be realized in three different forms, illustrated in FIG. 9 and described as Option 1 900 (FIG. 9*a*), Option 2 905 (FIG. 9*a*) and Option 3 910 (FIG. 9*b*).

Note that in the following description, the use of specific separators and naming conventions is for illustration purposes only; and other variations may be used.

In IDL Unbounded Sequence to SQL Table Map Option 1 900, a separate 'sequence table' is created per sequence field of the container; the sequence table name is derived by concatenating the container type name with the sequence field name, using a separator (illustrated as a "." in this example). The primary key of this table is the container's primary key (used as a foreign key), and the element index. The container table contains a field that holds the name of the sequence table to indicate the existence of the sequence field. The name of this field is derived by concatenating "sequence." (to indicate that it indirectly refers to a sequence) with the name of the sequence field. In this scheme, there are as many sequence tables as there are sequence fields in the container table (even if they are of the same underlying type).

In IDL Unbounded Sequence to SQL Table Map Option 2 905, a separate 'sequence table' is created per sequence field type in the container; the sequence table name is derived by concatenating the container type name with the name of the sequence element type, using ".Sequences." as the separator. The primary key of this table is the container's primary key (used as a foreign key), the name of the container's sequence field, and the element index. The container table contains a field that holds the name of the sequence table to indicate the existence of the sequence field. The name of this field is derived by concatenating "sequence." (to indicate that it indirectly refers to a sequence) with the name of the sequence field (which is used to access the elements of the sequence from the sequence table). In this scheme there are as many sequence tables as there are sequence types in the container table.

In IDL Unbounded Sequence to SQL Table Map Option 3 910, a separate 'sequence table' is created per sequence type; the sequence table name is derived by concatenating the "Sequences." with the name of the sequence element type; thus all sequence table names match "Sequences.*". The sequence table contains the name of the container table, and the name of the sequence field in the container table to identify a sequence. Since many different container types may have sequences of the same type, a common sequence table does not use any one container table's primary key as the foreign key to identify the row (data-object instance 200) it belongs to. Instead, the primary key of the sequence table is a unique "signature" generated from the container's row contents. The container table contains a field that holds the name of the sequence table to indicate the existence of the sequence field. The name of this field is derived by concatenating "sequence." (to indicate that it indirectly refers to a sequence field) with the name of the sequence field. In addition, the container has an extra "signature" field, that holds a unique signature (for example using MD5 sums) derived from the elements in that row. In this scheme there is one sequence table per sequence type in the system.

Having described the mapping between the DDS and DBMS concepts and data representation with reference to FIGS. 3 to 9, we now describe mechanisms for converting data from DDS and DBMS representations to a network wire format suitable for transmission between nodes.

Figure 10:
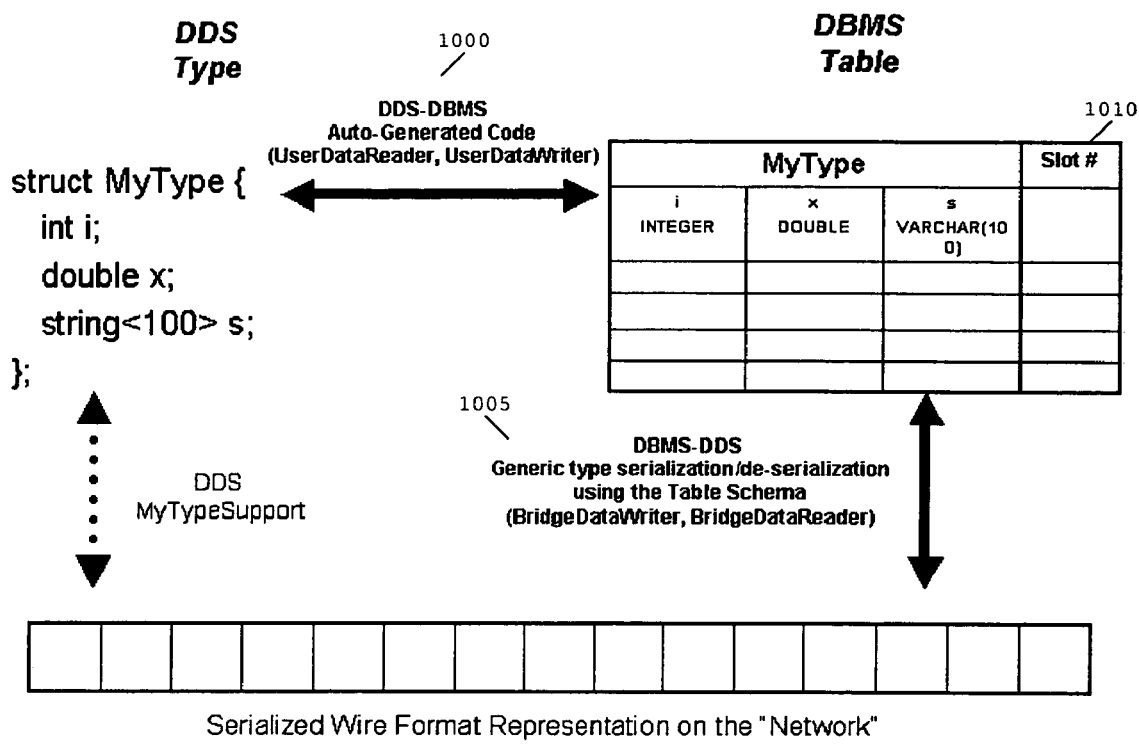
FIG. 10 is a Diagram of the conversion between a DDS data-object, a DBMS record, and the data representation used to communicate the value on a network.

FIG. 10 is a Diagram of the conversion between a DDS, DBMS, and Network wire format data representations.

User data is represented in several forms, with well defined mappings between the representations. In DDS user application 105 code, user data-object is represented as a structured data type 'MyType', with certain fields marked a "key" fields. A key field identifies a data-object; two variables with identical key fields represent possibly different samples of the same user data-object.

DDS middleware implementations provide methods for serializing & deserializing from the structured type representation in the programming language to a serialized wire format representation on the "network". These methods may be specific to a given type or may be written in a generic manner using a description of the type. The implementations also map a type into a unique data-object instance 200 id in the wire.

In the SQL user application 110 code, a user data is represented as a Table with a schema corresponding to the user data type, defined using the DDS-DBMS data map 400. A row in the table represents a user data-object. The DDSDBMS data conversion 1000 (DBMS-Propagater 1210 described later with reference to FIG. 12) can be implemented in one of the following two ways.

1. The methods to perform the conversion are generated for each given type in a middleware vendor specific manner.

2. The description to perform the conversion is generated for each given type in a middleware vendor independent manner. The description includes of a reflective type code, which is used by middleware vendor specific methods to serialize and deserialize a type. A reflective type code is an alternative description of the IDL type, that can be manipulated programatically. The reflective type code for an IDL type can be generated along with the DDS TypeSupport classes. A reflective type code can be propagated via discovery to other participants in a DDS domain, and can be used to verify type compatibility.

The DBMS-DDS wire format data conversion 1005 (Bridge DataWriter 1410, Bridge DataReader 1500 described later with reference to FIG. 14 and FIG. 15) serializes/deserializes between a DBMS table row and the wire format representation on the network. Therefore the conversion does not rely on DDS type specific code; instead the DBMS table representation is be directly serialized & deserialized from the serialized wire format representation on the "network". The DBMS-DDS wire format data conversion 1005 works as follows. The Table is queried for its schema (or some other alternative mechanism may be used to determine the data type format), and that is used as the type description to implement generic "serialize( )", "deserialize( )" methods. The generic methods must map the rows to a data-object instance 200 id on the wire in a manner consistent with the DDS user type mapping.

This approach is used to implement the Bridge DataWriter 1410 and the Bridge DataReader 1500 in the Bridge-DBMS-DDS-Publication component 1115 and Bridge-DBMS-DDS-Subscription component 1120. For example, to publish/subscribe a topic "foo" of type "Foo", a "generic" dynamic TypeSupport is registered and used by a Bridge DataReader 1500, Bridge DataWriter 1410. The generic type support serializes/deserializes the table rows directly into the network wire format. The dynamic TypeSupport uses the database Table schema or some other description of the type to configure itself.

Figure 12:
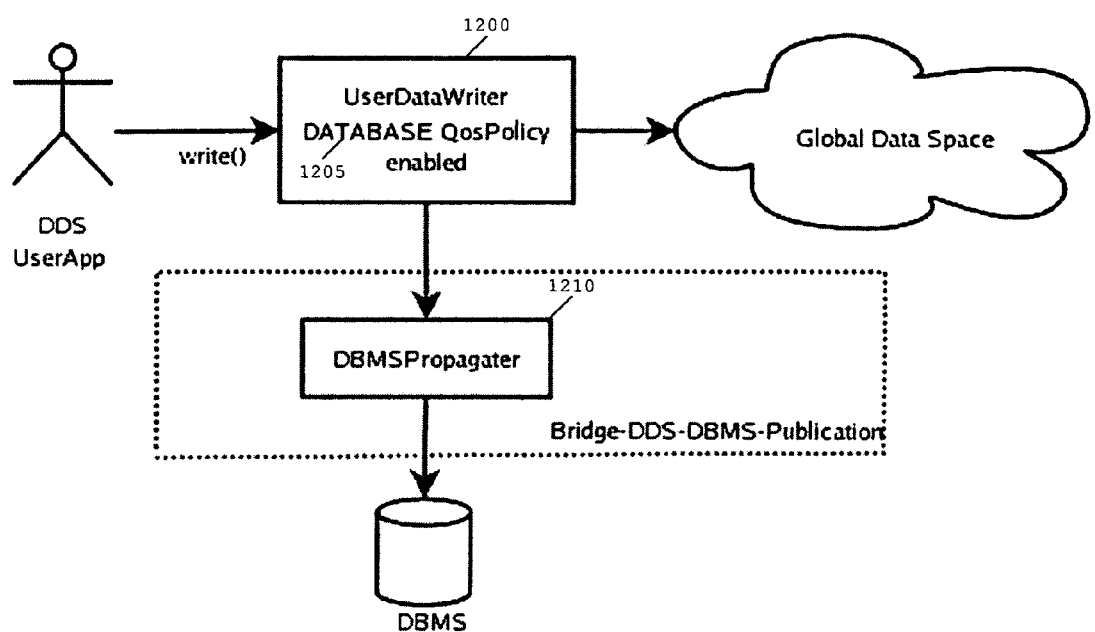
FIG. 12 is a Diagram of the Bridge-DDS-DBMS-Publication component.

An optional user configurable History Slot 1010 number of type INTEGER can be specified for a DBMS table, to keep track of the past N samples of a data-object instance 200. The History Slot 1010 (if specified) is added to the set of primary keys for the DBMS table. The number "N" of history samples to store for a data-object instance 200 is specified as a configuration parameter of the Bridge 1100-DDS-DBMS-Subscription and/or the Bridge 1100-DDS-DBMS-Publication components via the DATABASE QosPolicy 1205 (FIG. 12). In addition, a counter is maintained to keep track of the last updated history slot 1010. The counter rolls over to 0 every N samples. If unspecified, the default value of history is 1, i.e. only the last sample is stored in the DBMS. Helper methods can be provided so that the user can access the past K-th sample of a data-object instance 200.

Part II: Bridge 1100 components (FIGS. 11 to 16).

Having described the mapping between the DDS and DBMS data representations, we now turn our attention to describing the components that use the mapping to realize a unified global data space 100.

Figure 11:
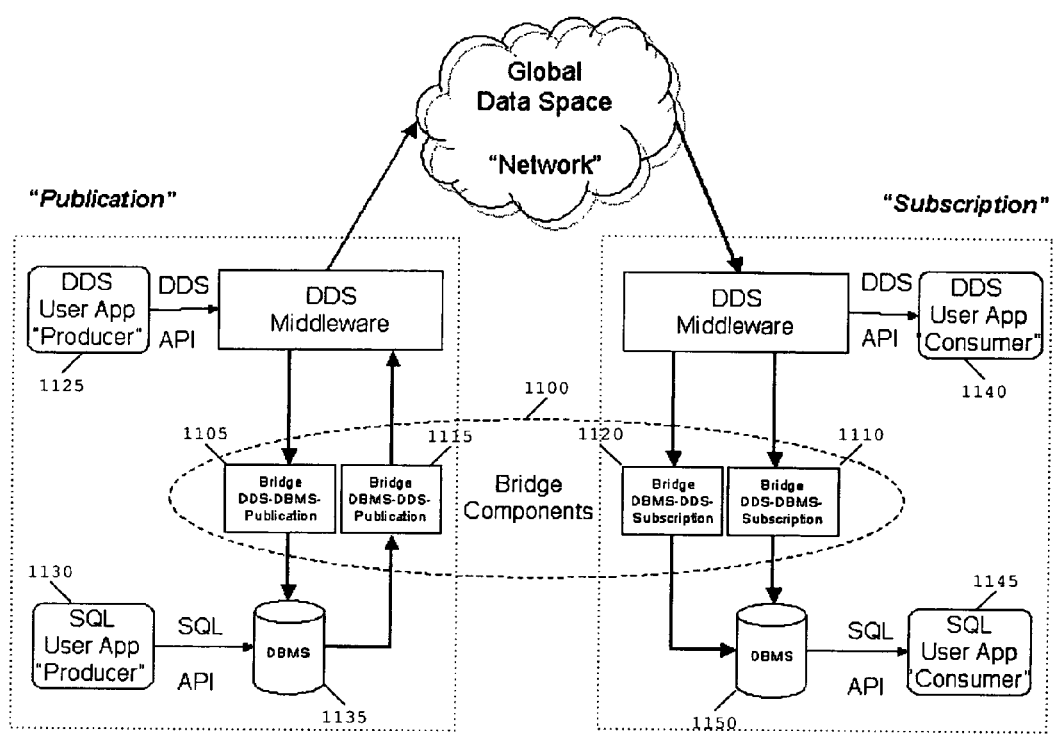
FIG. 11 is a Diagram of DDS-DBMS bridge components and the data flow paths.

FIG. 11 is a Diagram of bridge 1100 components and the data flow paths that may be utilized to realize the mapping and conversions described generally with reference to FIGS. 1 to 10.

In particular a bridge 1100 between DDS and DBMS technologies unifies the global data space 100 of DDS DBMS using the particular mappings described above. It includes components for mapping the addressing and data from DDS representation to the DBMS representation (DDSDBMS), and components for mapping the DBMS representation to the DDS representation (DBMS-DDS). The mapping can be performed during when publishing data to the network ("Publication") or when subscribing to data from the network ("Subscription").

The DDS-DBMS bridge 1100 components include Bridge-DDS-DBMS-Publication component 1105 and the Bridge-DDSDBMS-Subscription component 1110. The Bridge-DDS-DBMS-Publication component 1105 propagates the changes to a data-object instance 200 made via a user DataWriter 1200 in a producer user application 115, into an associated producer DBMS 1135. The associated producer DBMS 1135 is specified by a DATABASE QosPolicy 1205 on the user DataWriter 1200. Once the data is propagated to the producer DBMS 1135, it can be accessed by a producer SQL user application 1130 using the SQL API 125.

The Bridge-DDS-DBMS-Subscription component 1110 propagates the changes to a data-object instance 200 detected via a user DataReader 1300 in a consumer user application 115, into the associated consumer DBMS 1150. The associated consumer DBMS 1150 is specified by a DATABASE QosPolicy 1205 on the DataReader. Once the data is propagated to the consumer DBMS 1150, it can be accessed by a consumer SQL user application 1145 using the SQL API 125.

The DATABASE QosPolicy 1205 may be specified on a DDS DataReader or a DataWriter or both. It specifies the DBMS connection (username and password), the Database (or DSN), and the Table Name associated with a DDS User DataWriter 1200 or a DataReader. In addition it may specify the number of historical samples to store per data-object instance 200 in the DBMS table. Note that in this form, the DATABASE QosPolicy is specified in a DBMS vendor independent manner; different user DataWriters/DataReaders may persist data in different Databases; the Database itself is location independent and can be anywhere from being in the same process, node, or network. Also, the default values of the DATABASE QosPolicy 1205 may be specified at the level of a DDS DomainParticipant, a DDS Publisher or a DDS Subscriber.

In the following description we consider two DATABASE QosPolicies as identical if they refer to the same DSN and TableName.

The DDS-DBMS bridge 1100 components include the Bridge-DDS-DBMS-Publication component 1105 and the Bridge-DDS-DBMS-Subscription component 1110. They use a collection of functions or reflective type codes in generated code to support user data types. For example, for a user data type Foo, the FooDataWriter and FooDataReader generated code includes a set of functions or reflective type descriptions (meta-data) to apply the changes to the associated DBMS specified by the DATABASE QosPolicy 1205 (if enabled) when the DDS user invokes a FooDataReader:: write*( ) or a FooDataReader::take*( ) operation. Either of the DDS-DBMS data conversion 1000 techniques (namely generated type specific methods or a generated reflective type code description, FIG. 10) may be used to apply the changes to the associated DBMS.

The DBMS-DDS bridge 1100 components include Bridge-DBMS-DDS-Publication component 1115 and the Bridge-DBMSDDS-Subscription component 1120. The Bridge-DBMS-DDS-Publication component 1115 propagates the changes to a producer DBMS 1135 table row (data-object instance 200) made by a producer SQL user application 1130 into the network using DDS middleware. The SQL Table to "publish", the associated DDS domain id, type name, topic name, and the qos are specified by a Publications-Table 1415 in the component. The Bridge 1100-DBMS-DDS-Subscription updates a consumer DBMS 1150 user table rows (data-object instances) based on the changes in the global data space 100 received via DDS middleware. The SQL Table to "subscribe" to via DDS, the associated DDS domain id, type name, topic name, and the qos are specified by a Subscriptions-Table 1510 in the component. When a consumer SQL user application 1145 queries the consumer DBMS 1150, it will get the updated values reflecting the global-dataspace.

The DBMS-DDS bridge 1100 components may include either "compiled code" libraries linked (usually dynamically) with the DBMS, or a daemon process for publishing and subscribing to tables using DDS. Only the library/daemon for the component used by a producer SQL user application 1130 or consumer SQL user application 1145 is typically present.

Component libraries can be provided for each middleware vendor to be supported. A component library additionally specifies DDS middleware vendor specific means for initializing and configuring the component. For example, for the NDDS implementation, the component is configured with peer participants on the network.

When all the Bridge 1100-DDS-DBMS-Publication, Bridge 1100-DDS-DBMS-Subscription, Bridge 1100-DBMS-DDS-Subscription are used simultaneously with a DBMS, any one of them can modify the contents of a Table row. The changes are applied in the order they are seen by the DBMS.

FIG. 12 is a Diagram of the Bridge-DDS-DBMS-Publication component 1105 shown in FIG. 11.

The Bridge-DDS-DBMS-Publication component 1105 includes a 'DBMS-Propagater' which is a collection of functions to propagate an outgoing DDS sample update to the DBMS table specified by DATABASE QosPolicy 1205. For example, for a user type Foo, support for the DBMS-Propagater 1210 is generated along with the code for the FooDataWriter. This can be either in the form of Foo type-specific functions, or a reflective type description of Foo that is used by generic (type independent) functions defined in a compiled library. The generated DBMS-Propagater 1210 code performs the DDS-DBMS data conversion 1000 from the DDS data representation to the SQL Table data representation.

In operation, a producer DDS user application 1125 will create a user DataWriter 1200 for a topic "foo" of type "Foo", and specify a DATABASE QosPolicy 1205 to be enabled so that outgoing changes are stored in an associated DBMS. When a user FooDataWriter::write*( ) operation is called, the data is put on the wire via DDS first (to minimize latency), and then propagated to the associated database via the DBMS-Propagater 1210 functions.

Figure 13:
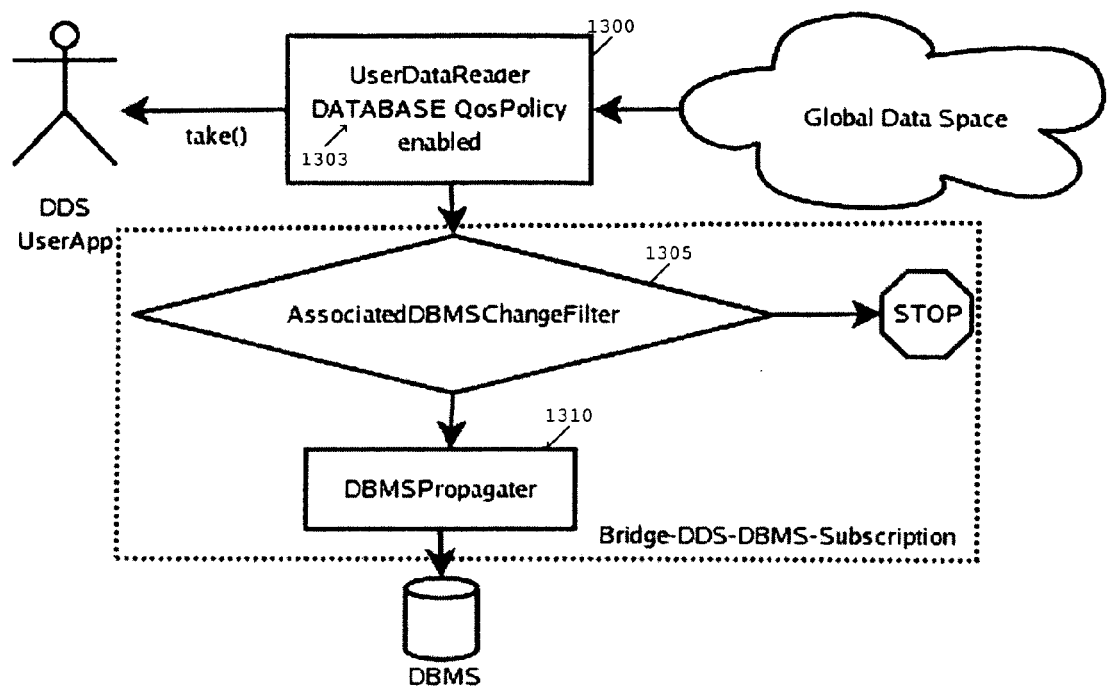
FIG. 13 is a Diagram of the Bridge-DDS-DBMS-Subscription component.

FIG. 13 is a Diagram of the Bridge-DDS-DBMS-Subscription component 1110 shown in FIG. 11.

The Bridge-DDS-DBMS-Subscription component 1110 includes a DBMS-Propagater 1210 (the subscription DBMS-Propagater 1310) which is a collection of functions to propagate an incoming DDS sample update to the DBMS table specified by subscription DATABASE QosPolicy 1303 (i.e. DATABASE QosPolicy 1205 specified on a User DataReader 1300). For example, for a user type Foo, support for the subscription DBMS-Propagater 1310 is generated along with the code for the FooDataReader. This can be either in the form of Foo type-specific functions, or a reflective type description of Foo that is used by generic (type independent) functions defined in a compiled library.

The DBMS-Propagater 1210 code performs the DDS-DBMS data conversion 1000 from the DDS data representation to the SQL Table data representation.

An Associated-DBMS-Change-Filter 1305 filters out changes received via DDS that have already been applied to the associated DBMS Table specified by the subscription DATABASE QosPolicy 1303. The changes could have been already applied to the DBMS table either via an associated user DataWriter 1200 with an identical (i.e. refer to the same DSN and TableName) DATABASE QosPolicy 1205, or the changes might have originated from a producer SQL user application 1130 directly modifying the DBMS Table and published via the Bridge-DBMS-DDS-Publication component 1115 (Bridge DataWriter 1410).

The Associated-DBMS-Change-Filter 1305 mechanism works as follows. Every DataWriter associated with the DBMS i.e. either a User FooDataWriter with an identical (i.e. refer to the same DSN and TableName) DATABASE QosPolicy 1205, or a Bridge DataWriter 1410 belonging to a Bridge-DBMS-DDS-Publication component 1115 associated with the DBMS) is configured to propagate the associated DATABASE QosPolicy 1205 in the PublicationBuiltinTopicData (say as an additional field, or embedded in the USER_DATA QosPolicy). A DataReader associated with DBMS (i.e. either a User FooDataReader, or a Bridge DataReader 1500 belonging to a Bridge-DBMSDDS-Subscription component 1120 associated with the DBMS) is configured to ignore the samples from DataWriters with identical (i.e. refer to the same DSN and TableName) DATABASE QosPolicy 1205. When a new DataWriter with a DATABASE QosPolicy 1205 identical (i.e. refer to the same DSN and TableName) to that of the DataReader is discovered (via the DDS PublicationBuiltinTopicDataDataReader::on_subscription_matched( ) listener), it is added to a "black-list" maintained by the bridge 1100 component. Data samples originating from a DataWriter in the "black-list" are ignored. Thus, incoming samples received via DDS, that have already been applied to the DBMS are not applied again.

In operation, a consumer DDS user application 1140 creates a user DataReader 1300 for a topic "foo" of type "Foo", and specifies a subscription DATABASE QosPolicy 1303 enabled so that incoming changes are stored in an associated DBMS. When a user accesses the received data via a FooDataReader::take*( ) or read*( ) operation, the user provided FooSeq is filled with data samples, and the changes are propagated to the associated DBMS Table via the DBMS-Propagater 1210 functions if they originated from a DataWriter not on the "black-list", and subsequently the FooSeq is returned to the consumer DDS user application 1140. Note that this scheme introduces some latency before the consumer DDS user application 1140 sees the data. The latency can be minimized by performing the DBMS propagation in a background concurrent thread, instead of synchronously in the user thread. Alternatively, the data can also be stored in the DBMS when it is first received by the DDS middleware (rather than when it is first accessed by the user). An implementation may provide one or more of these as configurable options.

Figure 14:
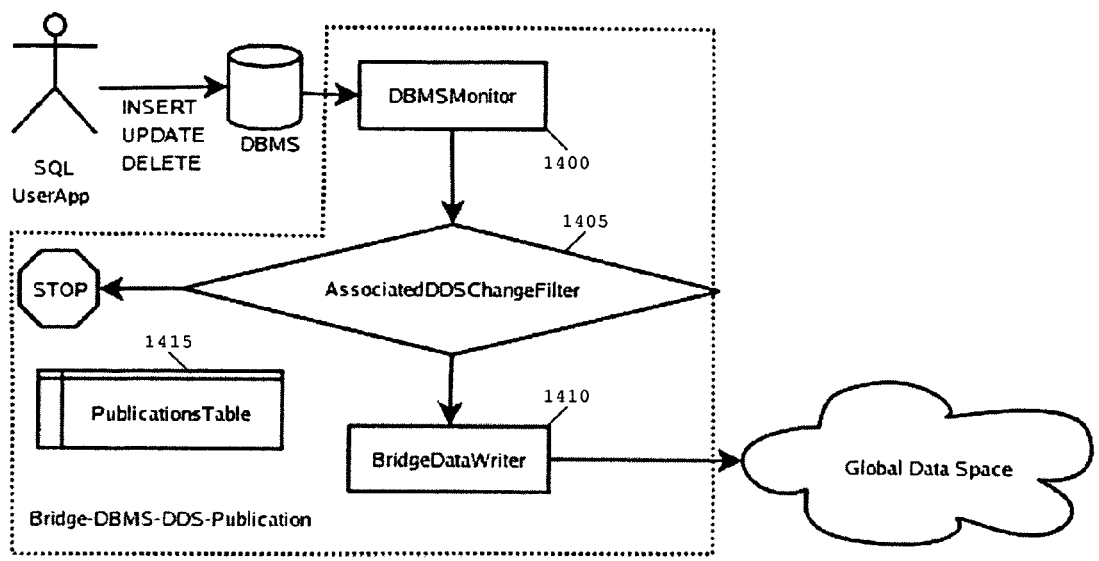
FIG. 14 is a Diagram of the Bridge-DBMS-DDS-Publication component.

Continuing with descriptions of the FIG. 11 bridge 1100 components in greater detail, FIG. 14 is a Diagram of the Bridge-DBMS-DDS-Publication component 1115.

The Bridge-DBMS-DDS-Publication component 1115 includes a Publications-Table 1415 which specifies the tables to be automatically published into the global data space 100 using DDS; a DBMS-Monitor 1400 for monitoring changes to the those tables; an Associated-DDS-Change-Filter 1405 to filter out changes in the DBMS that have already been distributed via DDS; and a Bridge DataWriter 1410 for serializing the rows changed in a table and publishing them using DDS.

The DBMS-Monitor 1400 "watches" for changes in specified DBMS tables. The monitoring scheme is DBMS vendor dependent, but can be categorized into two kinds of approaches:

1. An event (or interrupt, or callback) based mechanism, where the DBMS-Monitor 1400 is notified of the rows changed in a specified table. This mechanism typically uses the standard SQL triggers. An extra hidden field in user data tables may be used by the trigger handler to uniquely identify a record (thus serving as a simplified "alternative" primary key).

An event based mechanism could also be based on vendor specific DBMS APIs to monitor the changes in the DBMS transaction log. When a DBMS change event is detected, the transaction log is queried for the specific change.

An event based mechanism generally has better performance, since the changes are detected as they occur.

2. A polling based mechanism, where the specified DBMS tables are polled periodically for changes. This mechanism can be slow, but may be the only means when the DBMS does not provide an event based change detection mechanism.

Once a change in the specified DBMS tables is detected, the Associated-DDS-Change-Filter 1405 is used to filter out those changes that have already been distributed via DDS. The changes may have been published via a Bridge 1100-DDS-DBMS-Publication (a User DataWriter 1200 with an associated DATABASE QosPolicy 1205 specifying the DBMS), or may have been as a result of Bridge 1100-DDS-DBMS-Subscription or a Bridge 1100-DBMSDDS-Subscription (a User or a Bridge DataReader 1500) updating the DBMS.

One approach for implementing the Associated-DDS-Change-Filter 1405 mechanism is as follows. Two hidden columns are added to the user data table, namely "EPOCH" and "DOMAIN_ID". The EPOCH column is incremented when a change is distributed via DDS and applied to the table.

Thus, Bridge 1100-DDS-DBMS-Publication, Bridge 1100-DDSDBMS-Subscription, and Bridge 1100-DBMS-DDS-Subscription increment the EPOCH hidden column because the change is also distributed via DDS. If the change is due to a producer SQL user application 1130 directly performing an INSERT, UPDATE, or DELETE operation, the hidden EPOCH column is unchanged. The DOMAIN_ID column contains the DDS domain id of the DDS DataReader or the DataWriter (belonging to the Bridge 1100-DDS-DBMS-Publication, Bridge 1100-DDS-DBMS-Subscription, or the Bridge 1100-DBMS-DDS-Subscription components) that last changed the row.

When the change is detected by the DBMS-Monitor 1400, the hidden EPOCH column is checked. If the EPOCH column has changed and the DOMAIN_ID is the same as that of the Bridge DataWriter 1410, the change is filtered out; otherwise the change is propagated by the Bridge DataWriter 1410 into the global data space 100 via DDS. Thus, the EPOCH and DOMAIN_ID hidden columns are used to identify the changes that were not already distributed via DDS in the domain of the Bridge DataWriter 1410. Note that the old value of EPOCH is accessed in a DBMS vendor specific manner, generally dependent on the change detection mechanism.

A changed table row is distributed via the Bridge DataWriter 1410. A Bridge DataWriter 1410 is created for each entry in the Publications-Table 1415, using the specified DDS domain id, type name, and topic name, and the QoS. The Bridge DataWriter 1410 does not use any type specific code; instead it uses a generic type support class, which performs a DBMS-DDS wire format data conversion 1005 using the table schema to directly serialize the row contents into the DDS wire format.

In operation, a user application 115 (may be a producer SQL user application 1130, or a producer DDS user application 1125) configures the DBMS to load the Bridge-DBMS-DDS-Publication component 1115 in a DBMS vendor specific manner. The user application 115 configures the "meta-data" Publications-Table 1415 to specify the user data tables to be automatically published by the bridge 1100 component. Subsequent SQL user data changes (INSERT, UPDATE, DELETE) are published into the network via DDS.

Figure 15:
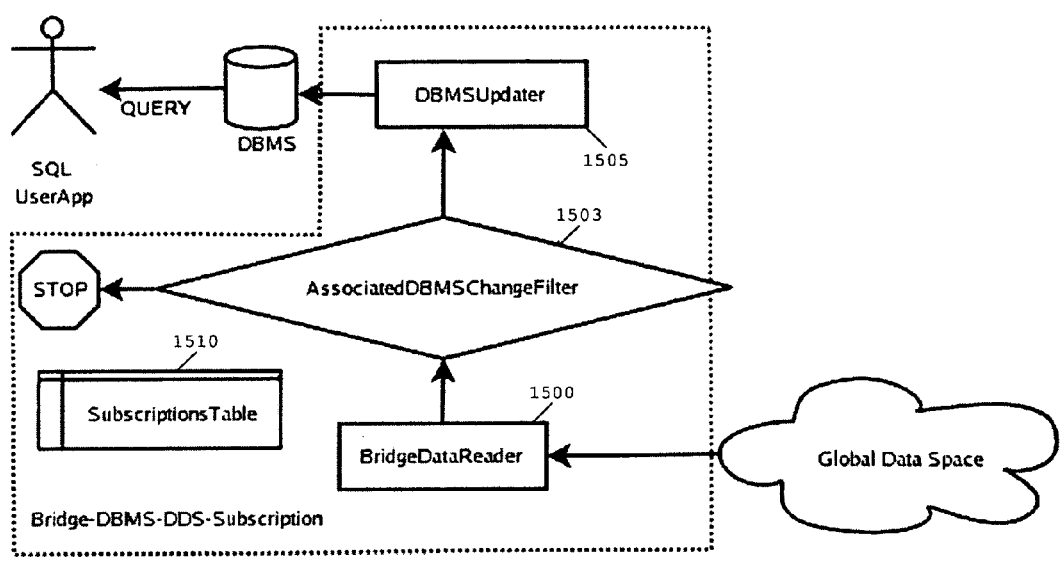
FIG. 15 is a Diagram of the Bridge-DBMS-DDS-Subscription component.

FIG. 15 is a Diagram of the Bridge-DBMS-DDS-Subscription component 1120 of the FIG. 11 bridge 1100 components.

The Bridge-DBMS-DDS-Subscription component 1120 includes a Subscriptions-Table 1510 which specifies the tables to be automatically subscribed from the global data space 100 using DDS; a Bridge DataReader 1500 associated with a Table for subscribing to corresponding DDS topics; and a DBMS Updater for updating the DBMS tables based on the changes received by a Bridge DataReader 1500.

A Bridge DataReader 1500 is created for each entry in the Subscriptions-Table 1510, using the specified DDS domain id, type name, and topic name. The Bridge DataReader 1500 does not use any type specific code; instead it uses a generic type support class, which performs a DBMS-DDS wire format data conversion 1005 using the table schema to directly deserialize the received data samples from the DDS wire format, to the table row updates.

The DBMS Associated-DBMS-Change-Filter 1503 mechanism is same as the one used for the Bridge 1100 DDSDBMS-Subscription component's Associated-DBMS-Change-Filter 1305; updates that originated from DataWriters with a DATABASE QosPolicy 1205 with identical associated DBMS Table are ignored.

The DBMS-Updater 1505 is used to apply the received changes obtained from the Bridge DataReader 1500 to the associated DBMS table.

In operation, a user application 115 (may be a consumer SQL user application 1145, or a consumer DDS user application 1140) configures the DBMS to load the Bridge-DBMS-DDS-Subscription component 1120 in a DBMS vendor specific manner. The user application 115 configures the "meta-data" Subscriptions-Table 1510 to specify the user data tables to be automatically subscribed by the bridge 1100 component. Subsequent SQL queries report the user data changes subscribed from the network via DDS.

FIG. 16 is a description of the Bridge-DBMS-DDS-Publication component 1115 and Bridge-DBMS-DDS-Subscription component 1120 Configuration Table Schemas.

The Publications-Table schema 1600 specifies columns for the name of the underlying DBMS table to publish ("table_name"), the DDS domain to publish the table changes to ("domain_id"), the topic under which the changes will be published ("topic_name"), and the type associated with the topic ("type_name"). In addition, it specifies the DataWriterQos to use for the Bridge DataWriter 1410 used to publish the changes.

The Subscriptions-Table schema 1605 specifies columns for the name of the underlying DBMS table to update ("table_name") by subscribing to incoming changes from DDS domain ("domain_id"), the topic used to subscribe to incoming changes ("topic_name"), and the type associated with the topic ("type_name"). In addition, it specifies the DataReaderQos to use for the Bridge DataReader 1500 used to subscribe to the changes.

The use cases below illustrate some examples of how DDS and DBMS bridge 1100 can be utilized to share a global data space 100 between a DDS user application 105 and a SQL user application 110.

Part III: Use cases (FIGS. 17 to 20).

Having described the mapping and components, we now describe selected useful applications that can be achieved using the bridge 1100 components. Many other use cases can be achieved by using other combinations and configurations of the bridge 1100 components.

Figure 17:
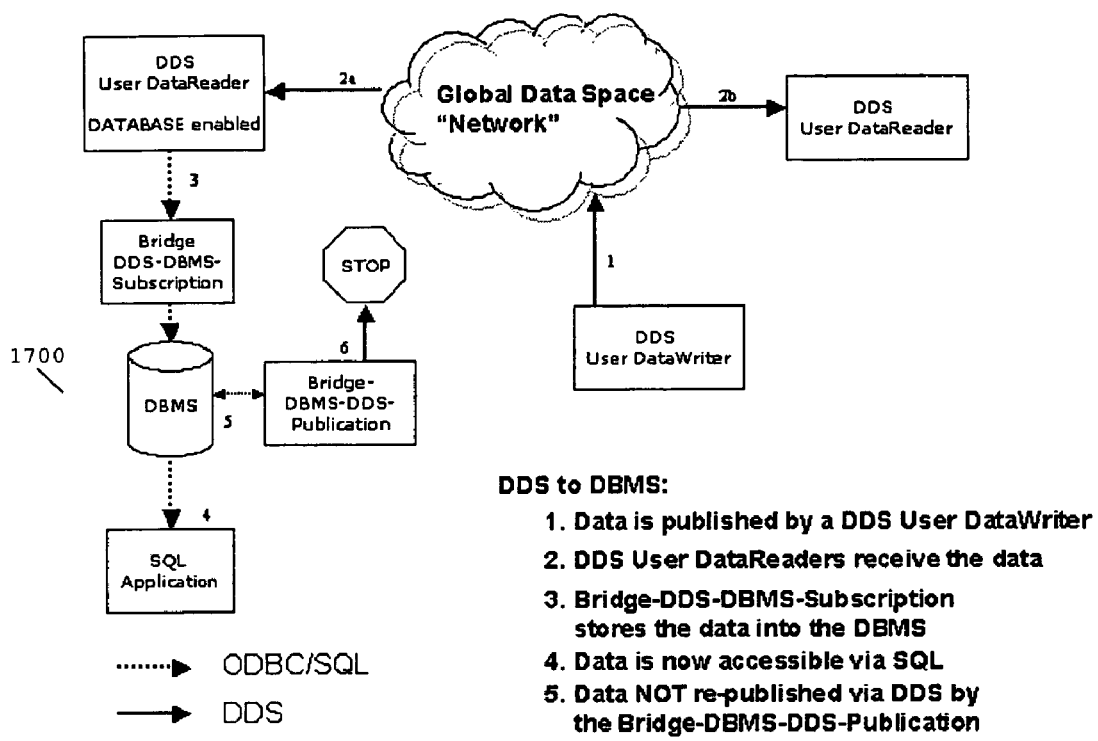
FIG. 17 is an Example of caching global data-objects in a DBMS.

FIG. 17 is an Example of caching global data-objects in a DBMS

A data caching use case 1700 can be realized by using the Bridge-DDS-DBMS-Subscription component 1110 to store received data in a DBMS, or by storing all outgoing data into a DBMS using the Bridge-DDS-DBMS-Publication component 1105.

FIG. 17 illustrates this for the DDS-DBMS-Subscription bridge 1100 component: a user DataWriter 1200 publishes updates to data-object instances (1), a user DataReader 1300 with DATABASE QosPolicy 1205 enabled specifies an associated DBMS in which to store all received samples (2a), the Bridge-DDS-DBMS-Subscription component 1110 is used to store the received data in a DBMS (3). The changes thus applied to the DBMS (5) are not re-published via the Bridge-DBMS-DDS-Publication component 1115 since they originated in DDS (6).

This approach can be utilized to implement the DDS DURABILITY QosPolicy.

FIG. 18 is an Example of Global Data-Object Persistency

A Global Data-Object Persistency use case 1800 can be realized by storing selected (or all) data-objects in the global data space 100 into a DBMS. This is achieved by using reflective types to automatically store global data-objects from all (or selected) topics into a DBMS.

In FIG. 18, when a new topic is discovered (1), its reflective type code is used to ensure a new DBMS table exists with a schema corresponding to the discovered topic's type. If such a table does not exist, one is automatically created (2) by applying the rules in the DDS-DBMS Data Map 400 to the discovered reflective type code. The Bridge 1100-DBMS-DDS-Subscription is configured to automatically update this Table (3, 4) from the global-data space, by ensuring there is an entry for it in the Subscriptions-Table 1510. Note that a Bridge-DBMS-DDS-Publication component 1115 can also be automatically configured (3) to propagate any changes made in the DBMS by an SQL user application 110 (5, 6, 7).

Note that a topic filter can be installed, so that only global data-objects on selected topics (those allowed by the filter) are persisted in the DBMS.

Figure 19:
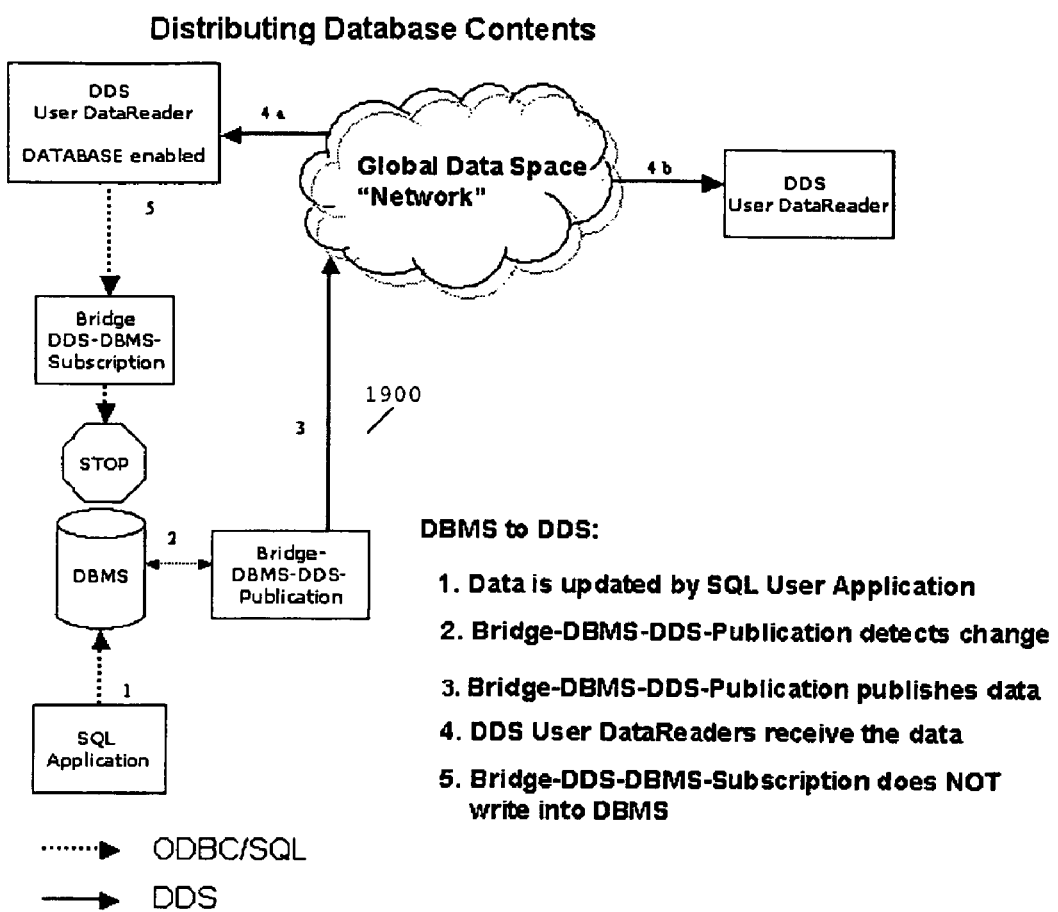
FIG. 19 is an Example of distributing database contents.

FIG. 19 is an Example of distributing database contents.

A database content distribution use case 1900 can be realized by using a Bridge-DBMS-DDS-Publication component 1115 to publish a specified table via DDS.

In FIG. 19, the user application 115 updates a DBMS table using SQL (1); this Bridge-DBMS-DDS-Publication component 1115 detects the change and propagates the data to other nodes via DDS (2, 3); user DataReaders get the data (4a); however they are not re-applied to the DBMS Table by a Bridge-DDS-DBMS-Subscription component 1110 (5) since they originated in the DBMS.

Figure 20:
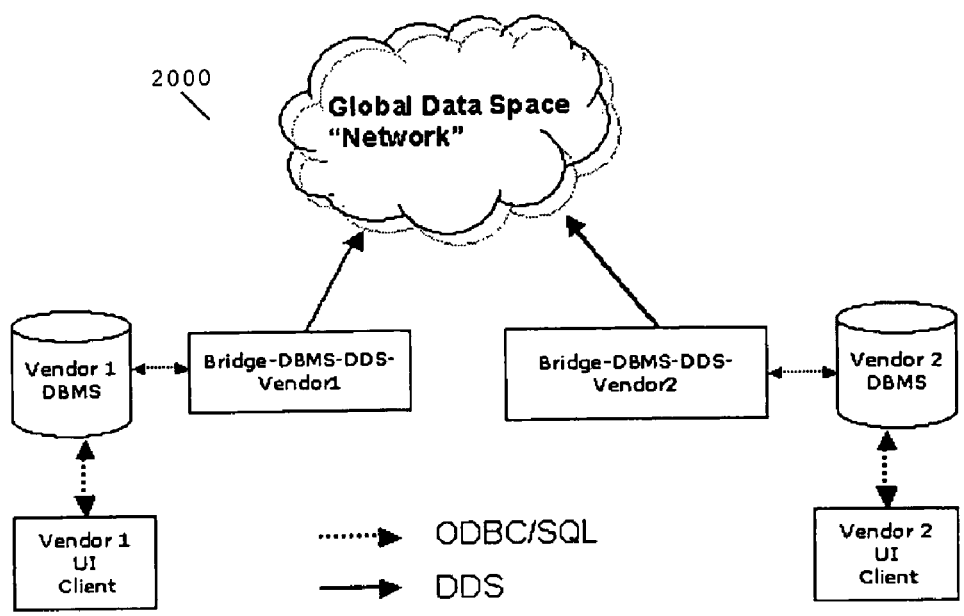
FIG. 20 is an Example of multi-vendor database content transfer.

FIG. 20 is an Example of multi-vendor database content transfer.

A multi-vendor database content transfer use case 2000 can be realized by configuring each DBMS to use its vendor specific Bridge 1100-DBMS-DDS-Publication and Bridge 1100-DBMS-DDS-Subscription components. The local changes are automatically distributed via the Bridge 1100DBMS-DDS-Publication into the global data space 100, and the changes to the global data-objects are automatically applied to the local DBMS tables via the Bridge 1100-DBMSDDS-Subscription. Thus, a global data-object may be modified in a DBMS from Vendor 1 and the change automatically propagated to a DBMS from Vendor 2.

Additional mechanisms can be built on top of this basic database content transfer mechanism, to achieve DBMS synchronization.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described particular embodiments, what is desired to be protected by Letters Patent is presented in the subsequently appended claims.

What is claimed is:

1. A computer-implemented method having at least one processor for unifying storage and distribution of data objects common to a set of user applications spread across a plurality of nodes coupled together to achieve a global data space, the method comprising:

in a distribution view of the global data space, carrying out distribution operations related to the distribution of data among the nodes comprising the global data space, wherein the data objects are organized into strongly-typed named topics and the distribution operations are enabled by middleware, executing on the nodes, to coordinate communication of changes to one or more user-defined data objects, wherein each user application may function as either or both of a data publisher and data subscriber to at least one of the strongly-typed named topics, and wherein the communication of changes to one or more user-defined data objects includes the middleware communicating changes to one or more user-defined data objects on a named topic from a data publisher user application for that named topic to at least one data subscriber user application for that named topic;

in a storage view of the global data space, carrying out storage operations related to the storage of data local to the nodes comprising the global data space;

mapping the storage operations and the distribution operations based on properties of the operations such that a storage operation automatically causes a distribution operation and a distribution operation automatically causes a storage operation, wherein the mapping step includes mapping between an operation for database modification and an operation for data distribution such that changes to a user data-object instance in the global data space made by a particular node via a data distribution write operation are propagated into a data storage operation with respect to the particular node.

2. The method of claim 1, wherein:

carrying out a distribution operation and carrying out a storage operation is with respect to a particular data object instance via a distribution operation application programming interface (API) and a storage operation application programming interface (API), respectively.

3. The method of claim 1, wherein:

the distribution operation API is configured such that the particular data object instance is accessible via distribution operation characteristics; and the storage operation API is configured such that the particular data object instance is accessible via storage operation characteristics.

4. The method of claim 1, wherein:

the mapping step is carried out by bridge functionality associated with the nodes.

5. The method of claim 4, wherein:

a particular portion of the bridge functionality is associated with each node and is configured to map the storage operations and the distribution operations with respect to that node.

6. The method of claim 5, wherein:

the particular portion of the bridge functionality being configured to map the storage operations and the distribution operations with respect to a node includes the particular portion of the bridge functionality being configured to map among parameters of each storage operation and corresponding parameters of each distribution operation.

7. The method of claim 6, wherein:

the particular portion of the bridge functionality being configured to map among parameters of each storage operation and corresponding parameters of each distribution operation includes the particular portion of the bridge functionality being configured to map between an operation for database modification and an operation for data distribution.

8. The method of claim 1, further comprising:

filtering a particular operation that would otherwise be automatically caused based on an operation mapping, in response to a determination that the particular operation has already been carried out.

9. The method of claim 7, wherein:

being configured to map between an operation for database modification and an operation for data distribution includes being configured to propagate changes to a user data-object instance in the global data space made by a particular node via a data distribution write operation into a data storage operation with respect to the particular node.

10. The method of claim 7, wherein:

being configured to map between an operation for database modification and an operation for data distribution includes being configured to propagate changes to a local user data-object instance made by a particular node as a result of a data distribution data access operation into a data storage operation with respect to the particular node.

11. The method of claim 7, wherein:

being configured to map between an operation for database modification and an operation for data distribution includes being configured to propagate a local data modification operation with respect to the particular node into changes to a user data-object instance in the global data space via a data distribution write operation.

12. The method of claim 11, wherein:
being configured to propagate a local data modification operation with respect to the particular node into changes to a user data-object instance in the global data space via a data distribution write operation is accomplished using a dynamically-linked library.

13. The method of claim 11, wherein:
being configured to propagate a local data modification operation with respect to the particular node into changes to a user data-object instance in the global data space via a data distribution write operation is accomplished using a standalone daemon.

14. The method of claim 7, wherein;
being configured to map between an operation for database modification and an operation for data distribution includes being configured to update the local storage with respect to the particular node in response to a changes to a user data-object instance in the global-data space via a data distribution data access operation.

15. The method of claim 14, wherein:
being configured to update the local storage with respect to the particular node in response to a changes to a user data-object instance in the global-data space via a data distribution data access operation is accomplished using a dynamically-linked library.

16. The method of claim 14, wherein:
being configured to update the local storage with respect to the particular node in response to a changes to a user data-object instance in the global-data space via a data distribution data access operation is accomplished using a standalone daemon.

17. The method of claim 1, wherein:
the propagation of changes to the user data object instance in the global data space into the data storage operation is according to a data storage quality of service policy.

18. The method of claim 1, wherein:
wherein the propagation is according to a set of functions or reflective type codes to propagate changes from a user datawriter in the data distribution view of the global data space to appropriate associated tables in the storage view of the global data space, optionally maintaining a rolling history.

19. The method of claim 1, wherein:
the mapping step further includes mapping between an operation for database modification and an operation for data distribution such that changes to a local user data-object instance made by a particular node as a result of a data distribution data access operation are propagated into a data storage operation with respect to the particular node.

20. The method of claim 19, wherein:
wherein the propagation into a data storage operation with respect to the particular node is according to a set of functions or reflective type codes to propagate changes from a user datareader in the data distribution view of the global data space to appropriate associated tables in the storage view of the global data space, optionally maintaining a rolling history.

21. The method of claim 19, wherein:
the mapping step further includes filtering out changes to a local user data object instance that have already been propagated into a data storage operation, so that the changes are not propagated again.

22. The method of claim 1, wherein:
the mapping step further includes mapping between an operation for database modification and an operation for data distribution such that a data storage operation with respect to the particular node is propagated into changes to a user data-object instance via a data distribution write operation.

23. The method of claim 22, wherein:
the mapping step further includes monitoring the database for the changes.

24. The method of claim 23, wherein:
the monitoring is event based.

25. The method of claim 23, wherein:
the monitoring is by polling.

26. The method of claim 22, wherein:
the mapping step further includes filtering out changes in the database that have already been propagated so that the changes are not propagated again.

27. The method of claim 22, further comprising:
processing a publication indication that indicates tables in the database to be published via the data distribution write operations and the user data-object instances in the global data space to which to publish.

28. The method of claim 1, wherein:
the mapping step further includes mapping between an operation for database modification and an operation for data distribution such that the local storage is updated with respect to the particular node in response to changes to a user data-object instance in the global-data space accessed by the node via a data distribution data access operation.

29. The method of claim 28, wherein:
the data storage operations with respect to data storage local to a particular node are configured according to parameters characterizing the local data storage.

30. The method of claim 29, wherein:
the parameters characterizing the local data storage include vendor-specific characteristics.

31. The method of claim 29, wherein:
the mapping between an operation for database modification and an operation for data distribution is performed by a database updater that updates appropriate tables in the local storage based on changes received by a reader of the data distribution data access operation.

32. The method of claim 29, further comprising:
processing a subscription indication that indicates tables in the database to be automatically updated based on changes to user data-object instances in the global data space via data distribution data access operations.

33. The method of claim 29, wherein:
the mapping step further includes filtering out modifications to the database that have already been propagated so that the changes are not made again.

34. The method of claim 1, wherein:
mapping the storage operations and the distribution operations includes mapping a semantic model of the storage operations and a semantic model of the distribution operations.

35. The method of claim 34 wherein:
mapping a semantic model of the storage operations and a semantic model of the distribution operations includes mapping a semantic model of the storage operations to a semantic model of the distribution operations.

36. The method of claim 34, wherein:
mapping a semantic model of the storage operations and a semantic model of the distribution operations includes mapping a semantic model of the distribution operations to a semantic model of the storage operations.

37. The method of claim 34, wherein:
the semantic model of the storage operations and the semantic model of the distribution operations are such that a domain in the data distribution view of the global data space maps to a database in the storage view of the global data space.

38. The method of claim 37, wherein:
the semantic model of the storage operations and the semantic model of the distribution operations are such that a topic in the data distribution view of the global data space maps to a table in the storage view of the global data space.

39. The method of claim 38, wherein:
the semantic model of the storage operations and the semantic model of the distribution operations are such that an user data-object instance, identified by instance key fields, in the data distribution view of the global data space maps to a row of a table, identified by a primary key, in the storage view of the global data space.

40. The method of claim 39, wherein:
a write( ) or variation of a write( ) data distribution operation maps to an insert/update row storage operation.

41. The method of claim 39, wherein:
a dispose( ) or variation of a dispose( ) data distribution operation maps to a delete row storage operation.

42. The method of claim 1, wherein:
mapping the storage operations and the distribution operations includes mapping a data representation used by the storage operations and a data representation used by the distribution operations.

43. The method of claim 42, wherein:
the data representation of the storage operations and the data representation of the distribution operations are such that interface description language instructions for distribution operations is mapped to SQL instructions for storage operations.

44. The method of claim 42, wherein;
the data representation of the storage operations and the data representation of the distribution operations are such that interface description language identifiers for distribution operations are mapped to SQL identifiers for storage operations.

45. The method of claim 42, wherein:
the data representation of the storage operations and the data representation of the distribution operations are such that interface description language types for distribution operations are mapped to SQL Table Schema for storage operations.

46. The method of claim 45, wherein:
interface description language structures are mapped to SQL tables, such that the SQL table columns correspond to the fields in the interface description language structure.

47. The method of claim 45, wherein:
interface description language unions are mapped to SQL tables, such that the SQL table columns correspond to the case statements and the fields in the union, in the interface description language structure.

48. The method of claim 45, wherein:
interface description language structures and unions are mapped to SQL tables, such that, for nested structures or unions, an SQL column corresponds to flattened out field names in the interface description language.

49. The method of claim 42, wherein:
user data in the data representation used for distribution operations is mapped to user data in the data representation used for storage operations, such that user data in the data representation used for distribution operations is converted to a corresponding table row representation using either type specific functions or a reflective type code.

50. The method of claim 42, wherein:
user data in the data representation used for distribution operations is mapped to user data in the data representation used for storage operations, such that user data in the data representation used for storage operations is converted to a corresponding distribution operations format using either the table schema or a reflective type code.

51. The method of claim 42, further comprising:
maintaining a rolling history of samples of a data distribution data-object instance in a storage table.

52. The method of claim 42, wherein:
mapping a data representation used by the storage operations and a data representation used by the distribution operations includes mapping table schema identifiers used by the storage operations and type identifiers used by the distribution operations.

53. The method of claim 52, wherein:
mapping table schema identifiers used by the storage operations and type identifiers used by the distribution operations includes mapping table schema identifiers used by the storage operations to type identifiers used by the distribution operations.

54. The method of claim 52, wherein:
mapping table schema identifiers used by the storage operations and type identifiers used by the distribution operations includes mapping type identifiers used by the distribution operations to table schema identifiers used by the storage operations.

55. The method of claim 42, wherein:
mapping a data representation used by the storage operations and a data representation used by the distribution operations includes mapping primitive types used by the storage operations and primitive types used by the distribution operations.

56. The method of claim 55, wherein:
mapping primitive types used by the storage operations and primitive types used by the distribution operations includes mapping primitive types used by the storage operations to primitive types used by the distribution operations.

57. The method of claim 55, wherein:
mapping primitive types used by the storage operations and primitive types used by the distribution operations includes mapping primitive types used by the distribution operations to primitive types used by the storage operations.

58. The method of claim 42, wherein:
mapping a data representation used by the storage operations and a data representation used by the distribution operations includes mapping complex types used by the storage operations and representations of the complex types used by the distribution operations.

59. The method of claim 58, wherein:
mapping complex types used by the storage operations and complex types used by the distribution operations includes mapping complex types used by the distribution operations to complex types used by the storage operations.

60. The method of claim 58, wherein:
the complex type is an unbounded sequence.
61. The method of claim 58, wherein:
the complex type is a bounded sequence or an array.
62. The method of claim 58, wherein:
mapping a data representation used by the storage operations and a data representation used by the distribution operations includes:
 mapping a SQL Table schema that is the data representation used by the storage operations to interface definition language types that is the data representation used by the distribution operations.
63. The method of claim 42, wherein:
mapping a data representation used by the storage operations and a data representation used by the distribution operations includes:
 mapping interface definition language types that is the data representation used by the distribution operations to a SQL Table schema that is the data representation used by the storage operations.
64. The method of claim 1, wherein:
the mapping step includes, within a node, mapping data distribution data access operations having a particular property to corresponding data store operations.

65. The method of claim 1, wherein:
the mapping step includes, within a node, mapping a data distribution access operation relative to a particular topic to a data storage operation for that topic.
66. The method of claim 65, further comprising:
within the node, processing data accessed via a data distribution access operation to discover a topic; and
configuring local data storage of that node to accommodate automatic data storage operations for that topic.
67. The method of claim 1, wherein:
the mapping step includes, for local data storage within a node, mapping data modification operations for a particular table with respect to local storage to corresponding data distribution write operations.
68. The method of claim 1, wherein:
the distribution operations related to the distribution of data among the nodes comprising the global data space are carried out according to a Data Distribution Service standard promulgated by Object Management Group.

\* \* \* \* \*